United States Patent
Helms

(10) Patent No.: US 11,996,070 B1
(45) Date of Patent: May 28, 2024

(54) ISOLATED GUITAR STRING AUDIO CAPTURE AND VISUAL STRING INDICATION AND CHORD-FINGER NUMBER OVERLAY PROCESS AND SYSTEM

(71) Applicant: John Michael Helms, Novato, CA (US)

(72) Inventor: John Michael Helms, Novato, CA (US)

(*) Notice: Subject to any disclaimer, the term of this patent is extended or adjusted under 35 U.S.C. 154(b) by 316 days.

(21) Appl. No.: 17/689,768

(22) Filed: Mar. 8, 2022

Related U.S. Application Data

(60) Provisional application No. 63/135,443, filed on Jan. 8, 2021.

(51) Int. Cl.
*G10H 1/00* (2006.01)
*G06T 19/00* (2011.01)
*G09B 15/00* (2006.01)

(52) U.S. Cl.
CPC ......... *G10H 1/0016* (2013.01); *G06T 19/006* (2013.01); *G09B 15/003* (2013.01); *G10H 1/0066* (2013.01); *G10H 2210/086* (2013.01); *G10H 2220/051* (2013.01); *G10H 2220/056* (2013.01); *G10H 2220/076* (2013.01); *G10H 2220/401* (2013.01); *G10H 2220/455* (2013.01); *G10H 2250/311* (2013.01)

(58) Field of Classification Search
CPC ............... G10H 1/0016; G10H 1/0066; G10H 2210/086; G10H 2210/051; G06T 19/006; G09B 15/003

See application file for complete search history.

(56) References Cited

U.S. PATENT DOCUMENTS

| | | | | |
|---|---|---|---|---|
| 6,995,310 | B1 * | 2/2006 | Knapp | G09B 5/065 84/645 |
| 8,629,342 | B2 * | 1/2014 | Lee | G10H 3/186 84/610 |
| 8,986,090 | B2 * | 3/2015 | Epstein | A63F 13/814 463/7 |
| 9,333,418 | B2 * | 5/2016 | Lee | G10H 1/0016 |
| 9,959,779 | B2 * | 5/2018 | Humphrey | G06Q 50/20 |
| 2011/0207513 | A1 * | 8/2011 | Cross | G10H 1/38 463/7 |

FOREIGN PATENT DOCUMENTS

WO   WO-2017150964 A1 * 9/2017

* cited by examiner

*Primary Examiner* — Robert W Horn
(74) *Attorney, Agent, or Firm* — Plager Schack LLP; Mark H. Plager; Stephen Hallberg

(57) ABSTRACT

An isolated guitar string audio capture and visual string indication and chord-finger number overlay process and system that provides a visual way to show what strings are being pressed and played during a guitar instruction video is disclosed. The isolated guitar string audio capture and visual string indication and chord-finger number overlay process and system visibly shows the student what strings are being pressed and played in a given chord by the guitar instructor in the video, all from one camera angle.

10 Claims, 6 Drawing Sheets

US 11,996,070 B1

ISOLATED GUITAR STRING AUDIO CAPTURE AND VISUAL STRING INDICATION AND CHORD-FINGER NUMBER OVERLAY PROCESS AND SYSTEM

CLAIM OF BENEFIT TO PRIOR APPLICATION

This application claims benefit to U.S. Provisional Patent Application 63/135,443, entitled "ISOLATED GUITAR STRING AUDIO CAPTURE AND VISUAL STRING INDICATION AND CHORD-FINGER NUMBER OVERLAY PROCESS AND SYSTEM," filed Jan. 8, 2021. The U.S. Provisional Patent Application 63/135,443 is incorporated herein by reference.

BACKGROUND

Embodiments of the invention described in this specification relate generally to musical instrument instruction, and more particularly, to an isolated guitar string audio capture and visual string indication and chord-finger number overlay process and system that shows identifiers of guitar strings that are being played and numerical identifiers for fingers used in a chord in a video.

Guitar instruction is often provided to students via video recordings that are streamed over the web and viewed on a computing device or other viewing device. However, the recorded videos typically make it very difficult to see what strings the guitar instructor is pressing and playing. Specifically, guitar instruction videos that exist today do not visibly show what strings are being pressed or played for a given chord because the instructor's hand obstructs the view of where she/he is pressing some of the guitar strings and the vibrational movement of the strings being played are not visible.

Therefore, what is needed is a way to show which strings are being pressed and played in a given chord by the guitar instructor in the video, all from one camera angle.

BRIEF DESCRIPTION

A novel isolated guitar string audio capture and visual string indication and chord-finger number overlay process and system is disclosed that shows identifiers of guitar strings that are being played and numerical identifiers of guitar strings that are being pressed by fingers in a video. In some embodiments, the isolated guitar string audio capture and visual string indication and chord-finger number overlay process and system visibly shows the student what strings are being pressed and played in a given chord by the guitar instructor in the video, all from a single camera angle. In this way, the isolated guitar string audio capture and visual string indication and chord-finger number overlay process and system provides ways of demonstrating which strings are being pressed and played during an instructional video in which an instructor is playing a musical instrument.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed.

Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
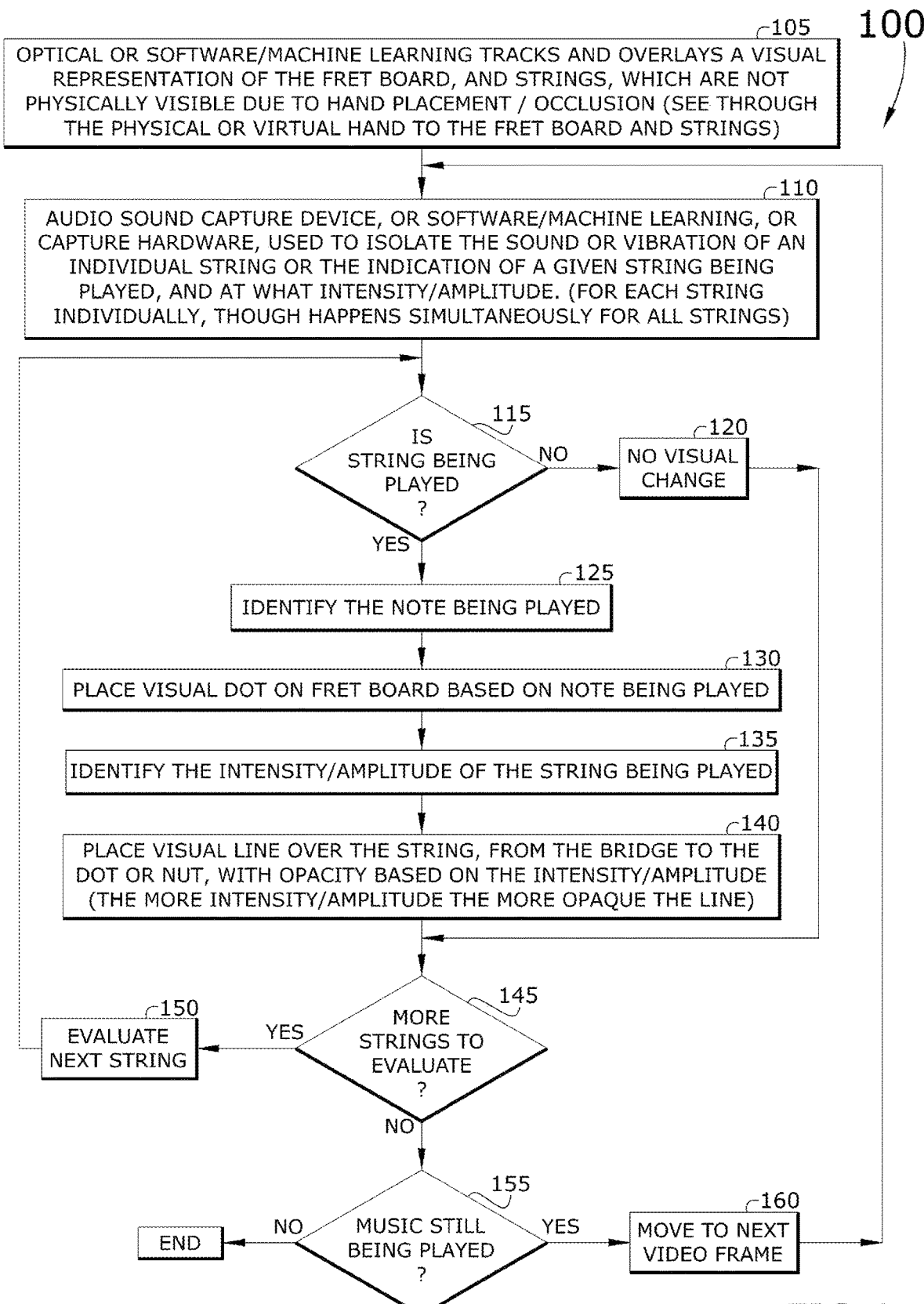
FIG. 1 conceptually illustrates an isolated guitar string audio capture and visual string indication and chord-finger number overlay process in some embodiments for demonstrating guitar strings that are being played and numerical identifiers of guitar strings that are being pressed by fingers in an instructional video.

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments provide a novel isolated guitar string audio capture and visual string indication and chord-finger number overlay process and system that shows identifiers of guitar strings that are being played and numerical identifiers of guitar strings that are being pressed by fingers in a video. In some embodiments, the isolated guitar string audio capture and visual string indication and chord-finger number overlay process and system visibly shows the student what strings are being pressed and played in a given chord by the guitar instructor in the video, all from a single camera angle. In this way, the isolated guitar string audio capture and visual string indication and chord-finger number overlay process and system provides ways of demonstrating which strings are being pressed and played during an instructional video in which an instructor is playing a musical instrument.

In some embodiments, the isolated guitar string audio capture and visual string indication and chord-finger number overlay process and system could be extended to support usage through augmented reality (AR) or virtual reality (VR), whereby the chords and strings a student needs to play would overlay the student's hands and guitar, giving the student a visual way to follow an instruction or lesson.

As stated above, existing guitar instruction videos do not show which strings are being pressed or played for a given chord because the instructor's hand obstructs the view of where she/he is pressing some of the guitar strings and the vibrational movement of the strings being played are not visible. Embodiments of the isolated guitar string audio capture and visual string indication and chord-finger number overlay process and system described in this specification solve such problems by overlaying a layer in the video with numerical identifiers of the guitar strings being pressed by the instructor, such that a student watching the video is able to visibly see which particular guitar strings are being pressed and played in a guitar instruction video.

Embodiments of the isolated guitar string audio capture and visual string indication and chord-finger number overlay process and system described in this specification differ from and improve upon currently existing options. In particular, some embodiments differ from other, existing guitar instruction videos which rely on the instructor to explain and show each finger hold, in a given chord. This often feels like a non-intuitive way to absorb the fingering alignment information, since it is typically presented out of sequence with the actual playing of the chord or string, and therefore, not synchronized with the sound emanating from the guitar as it is played. Still other guitar instruction videos try to show the instructor's hand from multiple angles or views, but this still cannot show where occluded fingers are pressing guitar strings all in one view. By contrast, the isolated guitar string audio capture and visual string indication and chord-finger number overlay process and system provides an overlay atop the video of the guitar instructor playing the guitar, such that the overlay visibly shows identifying elements (such as numerical identifiers) of all strings in a given chord that are pressed and visibly shows them while the instructor in the video is playing.

The isolated guitar string audio capture and visual string indication and chord-finger number overlay process and system may be comprised of the following steps and elements.

1. Start recording video and audio of the guitar used in the video, utilizing a divided guitar pickup to record every string individually as they are played.
2. Isolate the sound, by an isolation device such as a divided guitar pickup, coming from each string of the guitar individually.
3. Capture audio of the isolated sound from each string, the captured audio being a recorded sound.
4. Apply the captured audio (recorded sound) of the isolated sound from each string to a digital audio track of a multi-track audio recording in which each audio track corresponds to a different string of the guitar.
5. Overlay guitar chord fingering markers (numerical identifiers or other identifying elements) and semi-transparent guitar frets and strings on top of the instructor's hand in the recorded video.
6. Use the separate string audio tracks with recorded sounds (of the audio captured as isolated sounds of individual guitar strings) to drive the transparency of an overlay color placed on top of the strings to indicate which strings are being played at any given time.

By following the above-listed steps of the isolated guitar string audio capture and visual string indication and chord-finger number overlay process, a student (or viewer or other user) will be able to visibly see what fingers are pressed against the fretboard and what strings are played by the instructor (or presenter) in a video or presentation that would otherwise be hidden or difficult to visibly understand.

By way of example, FIG. 1 conceptually illustrates an isolated guitar string audio capture and visual string indication and chord-finger number overlay process 100 for demonstrating guitar strings that are being played and numerical identifiers of guitar strings that are being pressed by fingers in an instructional video. In the following description of the isolated guitar string audio capture and visual string indication and chord-finger number overlay process 100, reference is variously made to FIGS. 2-6. As noted above, guitar instruction (or other sting instrument instruction, for other music instrument instruction in general) is often provided to students via video recordings that are streamed over the web and viewed on a computing device or other viewing device by the students. However, for instructional purposes, such recorded videos are unable to demonstrate many of the key aspects in of the music instrument instruction. Specifically, recorded instructional videos for a string instrument, such as a guitar, fail to visually demonstrate the various strings the guitar instructor is pressing and playing since the instructor's hand and fingers normally obscure, obstruct, or altogether block the fret board locations at which the strings are being pressed. Furthermore, individual string vibration is typically not visible in such instructional videos. This leaves student viewers struggling to understand how to mimic or replicate the action of the instructor, or at least leaves the student to listen to spoken instructions rather than view the strings being pressed. Many students are left wondering if they are doing things right or wrong. This is demonstrated and described next, by reference to FIG. 2.

Figure 2:
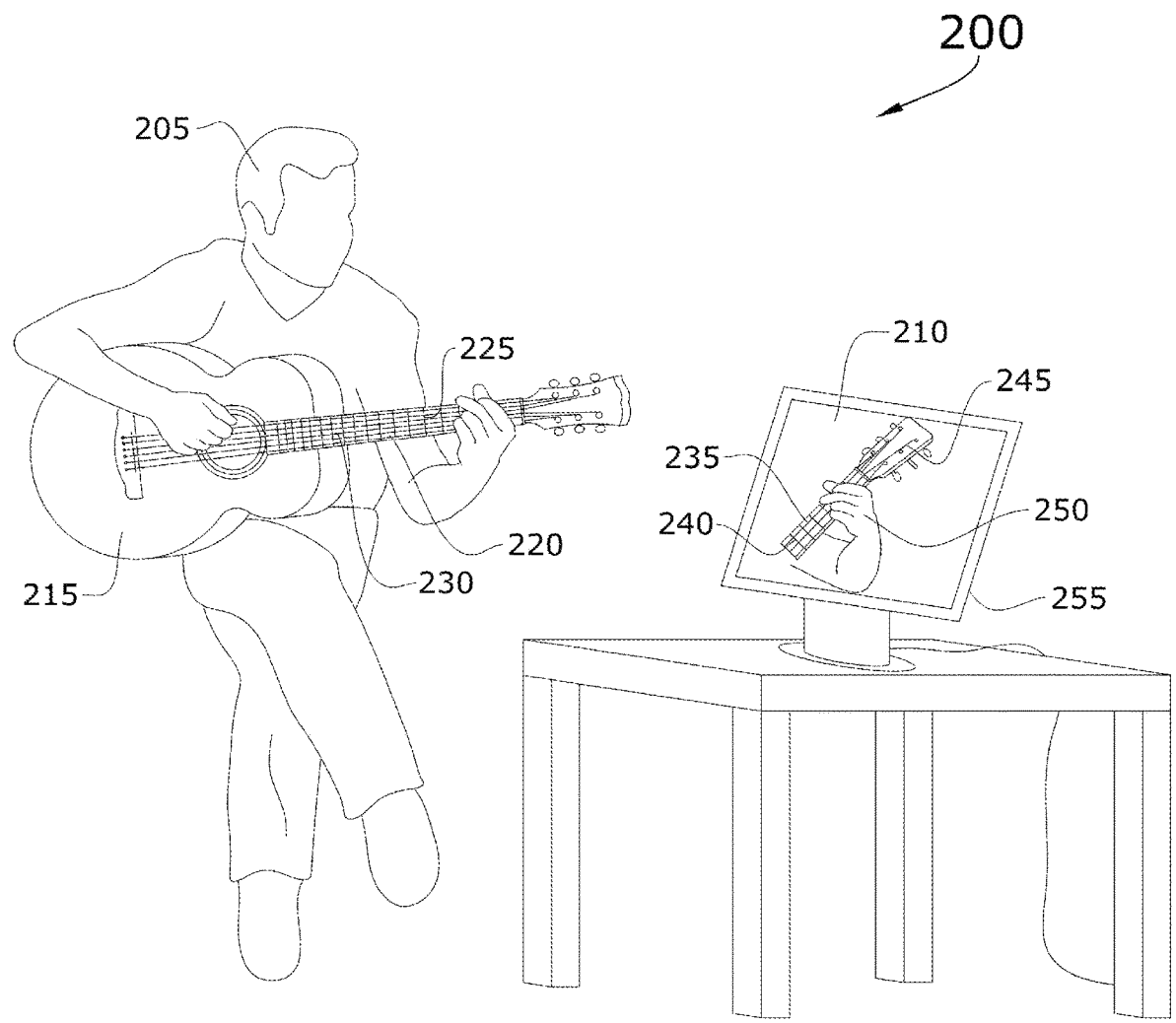
FIG. 2 conceptually illustrates a student view watching a guitar instructional video.
Figure 3:
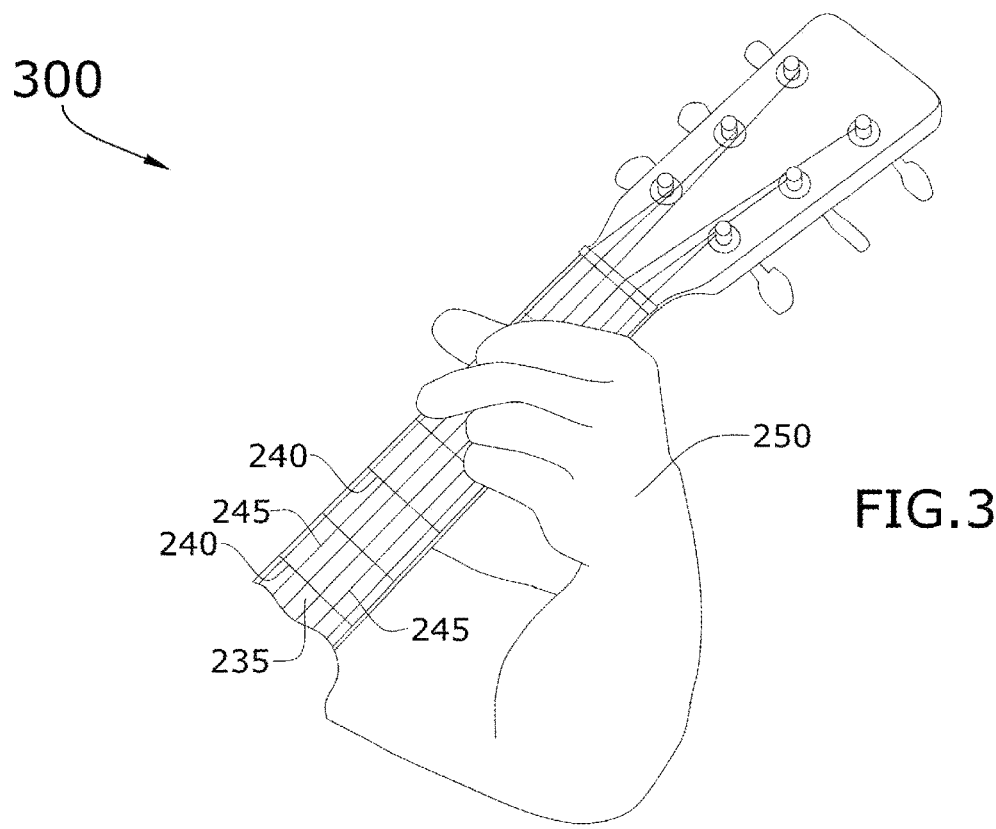
FIG. 3 conceptually illustrates a close-up view of a hand and fingers of an instructor obstructing a fret board and strings of a guitar being played to teach guitar in the guitar instructional video.

Specifically, FIG. 2 conceptually illustrates a student user watching a guitar instructional video 200. The student user 205 shown in this figure is viewing a monitor 255 with an instructional video 210 playing of a guitar instructor demonstrating various string and chord finger placement for playing the guitar. While observing the instructional video 210, the student user 205 plays a student guitar 215. Also shown is a fret board (neck) 220 of the student guitar 215, several individual frets 225 of the student guitar 215, and several individual strings 230 of the student guitar 215. Similarly, an instructor guitar fret board (neck) 235, several individual instructor guitar frets 240, and several individual instructor stings 245 are shown on the monitor 255 in the instructional video 210. Also, a hand and fingers 250 of the instructor are shown in the instructional video 210 obstructing the student user's 205 view of a portion of the instructor guitar fret board (neck) 235, some of the instructor guitar frets 240 and strings 245. As such, it may be difficult for the student user 205 at this juncture to identity the precise finger placement for the exact strings being pressed. Even pausing, rewinding, and re-playing the instructional video 210 may leave the student user 205 in doubt to as to the strings being pressed and to place their own fingers when playing the student guitar 215. However, the isolated guitar string audio capture and visual string indication and chord-finger number overlay process 100 of FIG. 1 provides a way to show which strings are being pressed and played in a given chord by the guitar instructor in the instructional video, without requiring multiple different camera angles, but instead, through a single point of view in the video that is captured from one camera angle.

Accordingly, by reference back to FIG. 1, the isolated guitar string audio capture and visual string indication and chord-finger number overlay process 100 starts by tracking and overlaying (at 105) visual line representations of a fret board and strings of a guitar being played by an instructor in a video. In some embodiments, the visual line representations are aligned with the fret board and strings of the guitar throughout the video and made to appear above the hand and fingers of the instructor while playing the guitar in the video. When the instructor is playing the guitar, the fret board and strings are obscured or blocked from view as the hand and fingers of the instructor plays notes and chords. Similar to FIG. 2, this is demonstrated in close-up view in FIG. 3. Specifically, FIG. 3 conceptually illustrates a close-up view of a hand and fingers of an instructor obstructing a fret board and strings of a guitar 300 being played to teach guitar in the guitar instructional video. While the fret board (neck) 235, several of the individual frets 240, and portions of all the strings 245 are visible, the hand and fingers 250 of the instructor obstruct the portion of the fret board (neck) 235 which is most essential for the student user to see which strings are being pressed. As such, it is difficult for a viewer of the video to visualize the notes being played. By contrast, the intention of tracking the fret board and strings of the guitar being played is to provide visual line representations of the fret board and strings in the video, and in correct alignment with the fret board, frets, and strings that are presently visible in the video, which is described further below, by reference to FIG. 4.

Now turning back to the isolated guitar string audio capture and visual string indication and chord-finger number overlay process 100 shown in FIG. 1. As noted above, the isolated guitar string audio capture and visual string indication and chord-finger number overlay process 100 starts by tracking and overlaying the visual line representations (at 105) of the fret board, the individual obstructed frets, and the obstructed portions of the strings of the guitar being played in the instructional video. For tracking and overlaying of the visual line representations to be accurate, alignment processing needs to be done. In some embodiments, alignment processing is performed for each frame of the video so that the visual line representations are generated to align with the fret board, individual frets, and strings of the guitar throughout the video. The tracking of the fret board, frets, and strings, therefore, also detects movements of the guitar which vary the alignment of the visual line representations from one frame to the next frame of the video. In some embodiments, the alignment processing involves detecting edges of the guitar neck, the fret board, and the strings, applying a vector in a two-dimensional space to each detected edge, and associated a frame number to each of the vectors in order to generate the visual line representations (for each frame of the video).

In some embodiments, overlaying the visual line representations occurs after tracking and alignment processing is completed for all frames of the entire video. In some embodiments, overlaying the visual line representations occurs contemporaneously while tracking the fret board and strings of the guitar on a frame-by-frame basis while the video is being analyzed to generate the visual line representations. In some embodiments, the visual line representations are generated and placed in a layer of the video as an overlay layer, such that the placement of the visual line representations in any particular frame of the video aligns with the recorded fret board and strings of the guitar in the video at that same particular frame. In some embodiments, the overlay layer is transparent except for the visual line representations. In this way, the isolated guitar string audio capture and visual string indication and chord-finger number overlay process 100 overlays the visual line representations so that the viewer of the video can clearly visualize the fret board and strings along the neck of the guitar (but otherwise obscured or blocked from view by the hand and fingers of the instructor). Furthermore, the visual line representations are shown in a way that allows the viewer to continue viewing (at least in part) the instructor, the instructor's hand, and the instructor's fingers. For example, the hand and fingers of the instructor are modified from opaque to translucent, so as to allow for more clearly visible line representations of the obstructed portion of the fret board, individual frets, and portions of the strings of the guitar.

In some embodiments, tracking the fret board and strings of the guitar, generating and aligning the visual line representations, and overlaying the visual line representations are performed by a visual edge detection machine learning (ML) and artificial intelligence (AI) engine of an optical video processing software application. In some embodiments, the visual edge detection ML and AI engine is configured to identify a fret board and strings of a guitar in a video by an edge detection process or other optical detection processing, generate two-dimensional vectors along natural lines (the detected edges) of the fret board and strings, and generate visual line representations of the vectors for placement on a transparent overlay layer, and add the overlay layer with the visual line representations to the recorded video as a resulting video. In some embodiments, the resulting video is a composite video. In some embodiments, the resulting video is a layered video. In some embodiments, the optical video processing software application outputs the resulting video.

Figure 4:
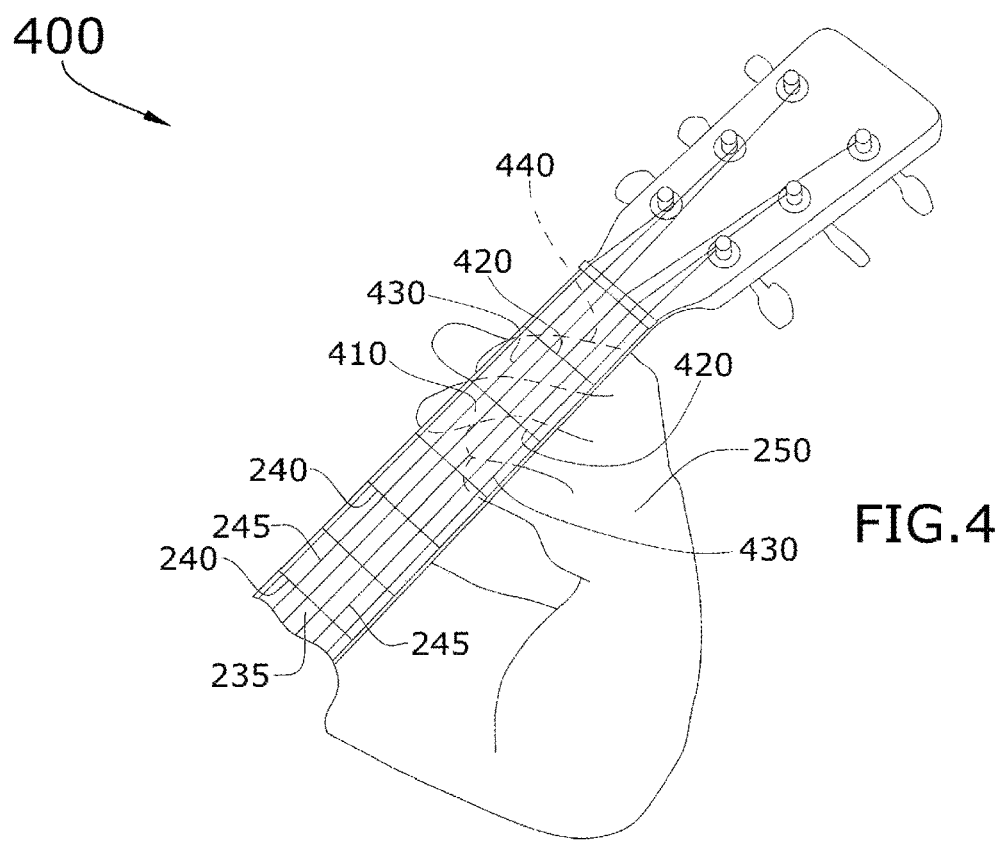
FIG. 4 conceptually illustrates a visible, unobstructed overlay of visual line representations of the fret board and strings of the guitar being played to teach guitar in the guitar instructional video.

Now turning to FIG. 4, which conceptually illustrates a visible, unobstructed overlay of visual line representations 400 of the fret board and strings of the guitar being played to teach guitar in the guitar instructional video. As shown in this figure, the visible, unobstructed overlay of visual line representations 400 demonstrates an overlay view that is added to the instructional video to reveal the previously obstructed portion of the fret board (neck) 235, as well as previously obstructed frets and partially obstructed strings. In particular, the visible, unobstructed overlay of visual line representations 400 demonstrates a translucent fret board (neck) overlay 410, individual fret line overlays 420, and individual partial string overlays 430, as well as translucent instructor hand and fingers 440 overlaying the essential portion of the fret board (neck) 410. In this way, the student user is able to view all the frets along the entire fret board neck of the guitar and the full length of all the strings of the guitar, as well as the instructor's hand and fingers, and their relative placement with respect to the fret board and strings.

Referring back to FIG. 1, the isolated guitar string audio capture and visual string indication and chord-finger number overlay process 100 of some embodiments isolates and captures the sound or vibration of each individual string and the intensity/amplitude of the string being played (at 110). In some embodiments, the sound/vibration of each string being played is isolated and captured by an audio sound capture device that has a MIDI connection to a string instrument sound source. In some embodiments, the sound/vibration of each string being played is isolated and captured by audio capture hardware that has a MIDI connection to a string instrument sound source. In some embodiments, the sound/vibration of each string being played is isolated and captured by a divided guitar pickup. In some embodiments, the sound/vibration of each string being played is isolated and captured by a computing device running a sound processing software application with a MIDI connection to a string instrument sound source. In some embodiments, the sound processing software application includes or is communicably connected to a MIDI-based audio sensitive detection and isolation machine learning (ML) and artificial intelligence (AI) engine. In some embodiments, the sound processing software application receives the isolated and captured audio from the audio sound capture device or the audio capture hardware. In some embodiments, the sound processing software application provides the received audio to the MIDI-based audio sensitive detection and isolation ML and AI engine for audio sound and intensity processing. In some embodiments, the MIDI-based audio sensitive detection and isolation ML and AI engine is configured to process the audio to identity isolated sounds of each string, detect the strings that are being played based on the isolated sounds, measure an intensity of the sound produced by playing the string, and represent the intensity measurement as a sound wave amplitude. Also, in capturing and isolation the sound of each string, it is noted here that this audio processing can occur simultaneously for all strings—both capturing and isolating, as well as other processing for sound and intensity/amplitude. In this way, the sound/vibration of each string being played can be isolated and captured for processing by MIDI-based audio sensitive detection and isolation ML and AI engine of the sound processing software application.

Alternatively, or in conjunction with the audio isolation and sound processing performed by the MIDI-based audio sensitive detection and isolation ML and AI engine of the sound processing software application, the isolated guitar string audio capture and visual string indication and chord-finger number overlay process 100 of some embodiments relies on a visual indication of a given string being played.

In some embodiments, after capturing and isolating the sounds and vibrations of the strings being played, the isolated guitar string audio capture and visual string indication and chord-finger number overlay process 100 processes each string individually for presence of sound. Starting with a first string (say, of a six string instrument), the isolated guitar string audio capture and visual string indication and chord-finger number overlay process 100 of some embodiments determines (at 115) whether the string is being played or not. When the string is not being played, the isolated guitar string audio capture and visual string indication and chord-finger number overlay process 100 makes no visual change (at 120) to the instructional video and proceeds to step for determining (at 145) whether there are any remaining strings to be evaluated for sound. On the other hand, when it is affirmatively determined (at 115) that the string is being played, then the isolated guitar string audio capture and visual string indication and chord-finger number overlay process 100 identifies the note being played (at 120) for the string. Once the note is identified, the isolated guitar string audio capture and visual string indication and chord-finger number overlay process 100 places a visual dot, indicator, or marker on the fret board overlay and string(s) based on the note being played (at 130).

Figure 5:
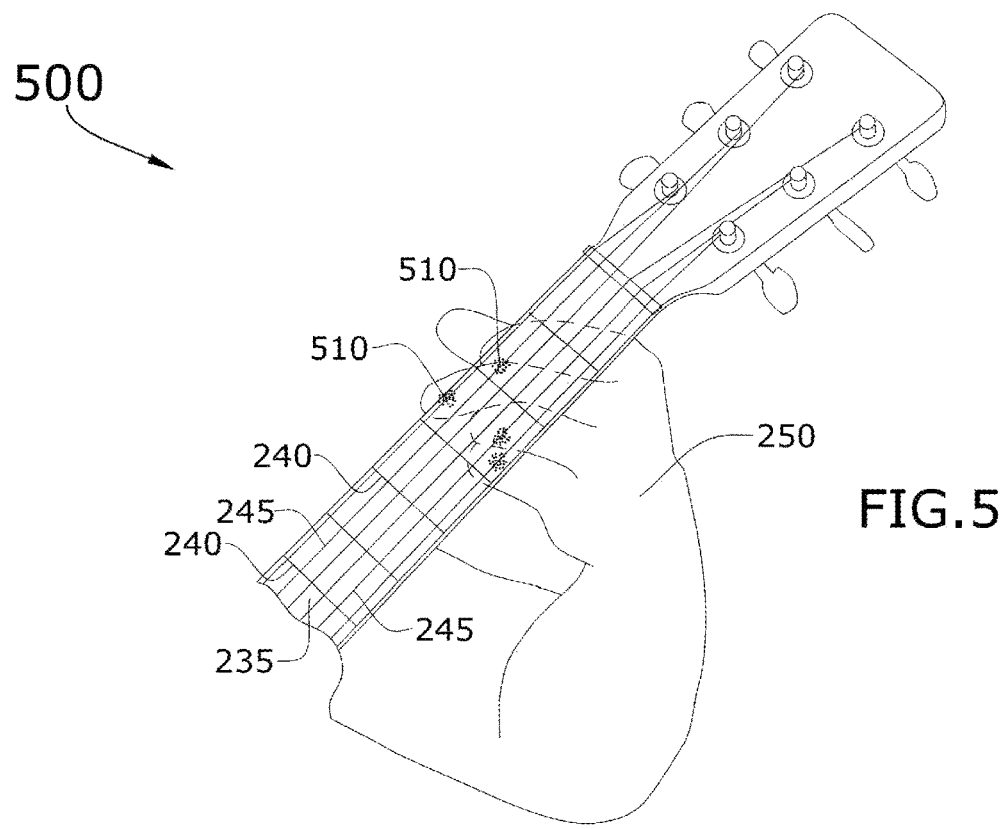
FIG. 5 conceptually illustrates visual indication markers placed at fret board locations of strings being pressed by the instructor's fingers in the guitar instructional video.

By way of reference, FIG. 5 conceptually illustrates visual indication markers placed at fret board locations of strings being pressed by the instructor's fingers in the guitar instructional video 500. As shown in this figure, visual indication markers 510 are placed in the overlay view of the fret board and string. The visual indication markers 510 are specifically placed according to which strings are being pressed, as detected by the audio isolation and capture of the sound of coming from the guitar as the instructor plays in the video.

Now turning back to FIG. 1, after identifying the note being played and placing the visual dot, indicator, or marker on the fret board, the isolated guitar string audio capture and visual string indication and chord-finger number overlay process 100 measures or identifies the intensity/amplitude of the string being played (at 135). Then the isolated guitar string audio capture and visual string indication and chord-finger number overlay process 100 places a visual line in the instructional video over the string being played (at 140). In some embodiments, the visual line is placed from the bridge of the guitar to the nut or, when the string is depressed, to the dot, indicator, or marker. In some embodiments, opacity of the line is based on the measured intensity/amplitude. For example, the greater the intensity/amplitude, the greater the opacity of the line.

Figure 6:
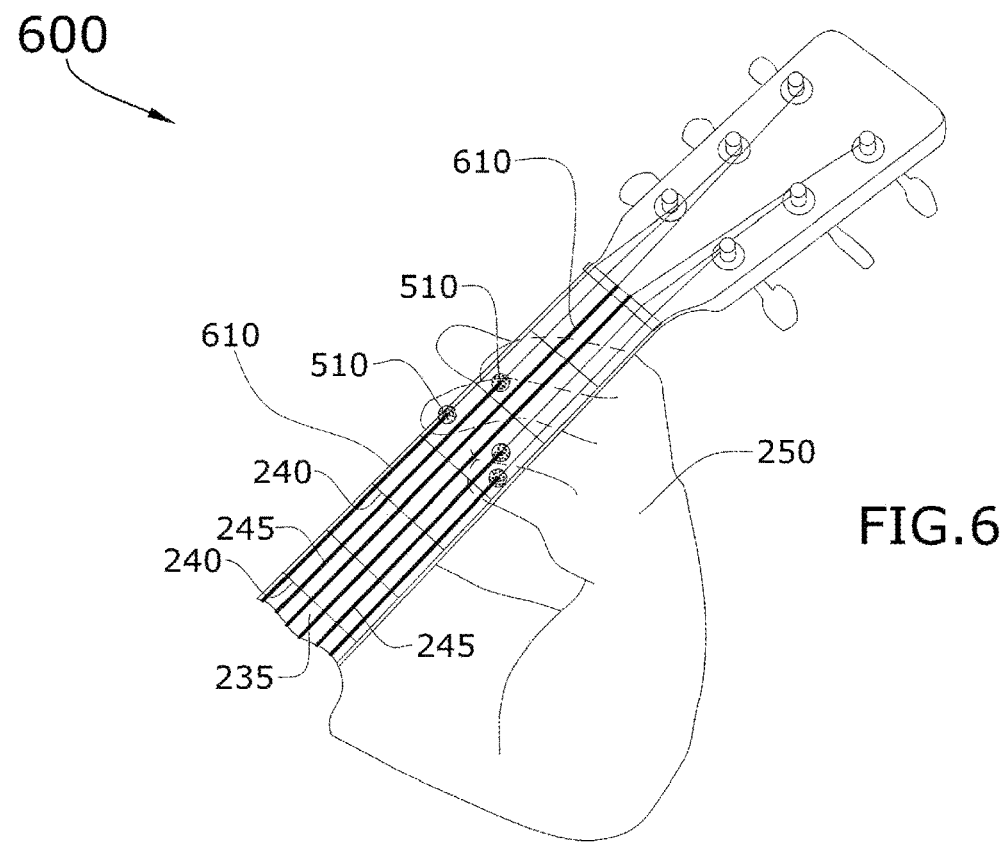
FIG. 6 conceptually illustrates line overlays placed on strings of the guitar being played with individual string intensity and amplitude demonstrated by line weighting that represents line opacity level shown in the guitar instructional video.

By way of example, FIG. 6 conceptually illustrates line overlays 610 placed on strings of the guitar 600 being played with individual string intensity and amplitude demonstrated by line weighting that represents line opacity level shown in the guitar instructional video.

Turning again to FIG. 1, the isolated guitar string audio capture and visual string indication and chord-finger number overlay process 100 moves on to a step for determining (at 145) whether there are more strings to evaluate. As mentioned above, in some embodiments, the sound of all strings is captured and isolated string-by-string. Thus, the isolated guitar string audio capture and visual string indication and chord-finger number overlay process 100 evaluates each isolated string sound one by one. For example, a six string guitar will proceed through this sequence six times. Furthermore, the sequence will proceed for each frame of the video or at some other pre-determined rate, such as the refresh rate of the monitor through which the student user is watching the instructional video. Accordingly, when there are more strings to evaluate, the isolated guitar string audio capture and visual string indication and chord-finger number overlay process 100 proceeds to evaluate the next string (at 150). For example, the second string in a six string instrument. Then the isolated guitar string audio capture and visual string indication and chord-finger number overlay process 100 transitions back to the start of the sequence to determine whether the string being evaluated in this round is being played (at 115). The isolated guitar string audio capture and visual string indication and chord-finger number overlay process 100 continues through the steps until reaching the determination (at 145) of whether there are more strings to evaluate, continuing through the cycle until the final string has been evaluated. In the case of a guitar, for example, after the sixth string has evaluated and string dots, indicators, or markers are placed along with intensity/amplitude weighted lines placed on strings, and so forth.

Now, when the determination (at 145) is made that there are no more strings to evaluate, then the isolated guitar string audio capture and visual string indication and chord-finger number overlay process 100 continues to another step for determining (at 155) whether the music is still being played. When music is determined (at 155) to be continuing to play, then the isolated guitar string audio capture and visual string indication and chord-finger number overlay process 100 moves to the next frame in the video (at 160). The isolated guitar string audio capture and visual string indication and chord-finger number overlay process 100 transitions back to the step for capturing and isolating the sound of the strings (at 110) and proceeds as described above. On the other hand, when the instructor has stopped playing guitar, the music is not playing and, therefore, the isolated guitar string audio capture and visual string indication and chord-finger number overlay process 100 ends.

While the steps of the isolated guitar string audio capture and visual string indication and chord-finger number overlay process 100 are described separately for clarity, it is noted here that it is possible to accomplish these steps in combination as a single step. Furthermore, in some embodiments, additional steps or intervening steps may be applied, such as capturing the video of the guitar instructor playing, detecting the strings being pressed based on an analysis of the captured audio, providing numerical identifiers as an overlay video based on the detected strings, and streaming out the composite video of the instructor playing the guitar with the overlay video and numerical identifiers showing the strings that are being played, either as a recorded video posted for subsequent viewing or in near real-time for live viewing. Also, the detection of the strings based on the captured audio may instead involve an equivalent acquisition of individual audio from each string using other hardware, such as a MIDI pickup. Whatever method of string detection is used, the point is to acquire data that shows when each individual string is played, including intensity, independently of other strings.

When the isolated guitar string audio capture and visual string indication and chord-finger number overlay process 100 is performed according to the steps above, or an alternative isolated guitar string audio capture and visual string indication and chord-finger number overlay process is performed, the result is that the viewer of the instructional video (the student user) will be able to visibly see the finger positions on the fret board for any given chord and what strings are played by the guitar instructor in the video or presentation.

To make the isolated guitar string audio capture and visual string indication and chord-finger number overlay process and system of the present disclosure, one may capture video or movement of a guitar lesson and simultaneously use a divided guitar pickup (or other hardware that will accomplish the same result) affixed to the guitar to record the sound coming from each guitar string individually on separate digital audio tracks. Then overlay a semitransparent static image of guitar frets and strings over the instructor's hand, so the image lines up with the actual guitar frets and strings, which will give the hand the appearance of being semi-transparent when the instructor's hand is over the fret board. In addition, by using the separate guitar string digital audio track amplitudes, one can control the transparency of an added line or color that will overlay each of the strings. When the amplitude of the audio for a given string is high, the string may be covered with a visible line or color that indicates the string has been played. When the audio amplitude for a given string is low, the string may not be covered with a visible line or color, which would then show the string has not been played. By overlaying guitar chord fingering markers on top of the instructor's fingers, this would indicate where each finger is pressing a string against the fret board in a given chord, matching the chords and timing of the chords being played by the instructor. If the guitar's position is not static relative to the video or motion capture system, it may be possible to use tracking hardware or software on set, in near real-time, or in post-production to track the movement of the guitar. Then apply the resulting tracking movement of the guitar to all elements that are added so these elements will move with the guitar and have the appearance of tracking with or sticking to the guitar.

The placement of chord markers of a given chord over the instructor's fingers to show which fingers are pressing strings and where those fingers are pressing strings against the fretboard in that given chord is not a limiting aspect, but is demonstrated as an example of to make the isolated guitar string audio capture and visual string indication and chord-finger number overlay process and system work. In some other embodiments, chord markers of the given chord may be overlayed on the video in different positions, such as to the side of the instructor's fingers/hand (e.g., in a background area of the video). Also, showing the semitransparent version of the frets and strings is an example of how the isolated guitar string audio capture and visual string indication and chord-finger number overlay process and system is able to communicate vital visual information to the viewer, since positioning the semi-transparent guitar frets and strings on top of the instructor's hand can provide further visual certainty to the viewer. Yet in some other embodiments, the guitar frets are not highlighted, or other visual cues for the guitar frets may be provided, such as a blinking semi-transparent guitar fret when pressed. Additionally, in some other embodiments no lines are placed over the strings being played, or flashing semi-transparent lines are shown individually to highlight, or draw visual attention, when a given string is being played. In some embodiments, the steps and elements of the isolated guitar string audio capture and visual string indication and chord-finger number overlay process and system are implemented into multi-angle guitar instruction videos, such that a change of viewing angle prompted by the viewer or while recording automatically transposes overlay elements according to their updated visual spacing and position relative to the selected camera angle (or distance, such as in a virtual reality-based video).

Additionally, the isolated guitar string audio capture and visual string indication and chord-finger number overlay process and system could be applied to how to play a given song on a guitar. Furthermore, the isolated guitar string audio capture and visual string indication and chord-finger number overlay process and system could be applied to muscle memory exercises using a guitar. The isolated guitar string audio capture and visual string indication and chord-finger number overlay process and system of some embodiments could be adapted for use in generating guitar sheet music in combination with or absent the video overlay aspect. In some embodiments, the isolated guitar string audio capture and visual string indication and chord-finger number overlay process and system could be applied to guitar instruction delivered through virtual reality (VR) or augmented reality (AR) delivery systems. In addition, the isolated guitar string audio capture and visual string indication and chord-finger number overlay process and system could be adapted for application to other stringed instruments, not just the guitar.

While many of the examples in this specification refer to a guitar as the musical instrument, the isolated guitar string audio capture and visual string indication and chord-finger number overlay process and system of the present disclosure works for other musical instruments, particularly, most string instruments and other non-string instruments, such as woodwind instruments (e.g., saxophone, clarinet, etc.) or keyboard instruments (e.g., piano, MIDI keyboard, etc.).

Furthermore, instead of being limited to instructional videos, the isolated guitar string audio capture and visual string indication and chord-finger number overlay process and system can be applied to other forms of music instruction, such as augmented reality (AR) systems in which instruction is provided through a mobile app or tablet computing device placed in position of a user guitar to provide overlays of string notes, fret board, frets, etc. (or equivalent for other string instruments) or virtual reality (VR) systems in which instruction is provided to a student user who is wearing VR goggles and interacting within a virtual world/environment in which a virtual avatar or image of an instructor provides instruction and overlays of visual markers and visual line representations (or equivalents for non-string instruments) are presented in the virtual world/environment via the VR goggles and visually informs the student user in realtime of the specific notes, strings, frets, etc., that are being played at any given time. This is shown in the next example.

Figure 7:
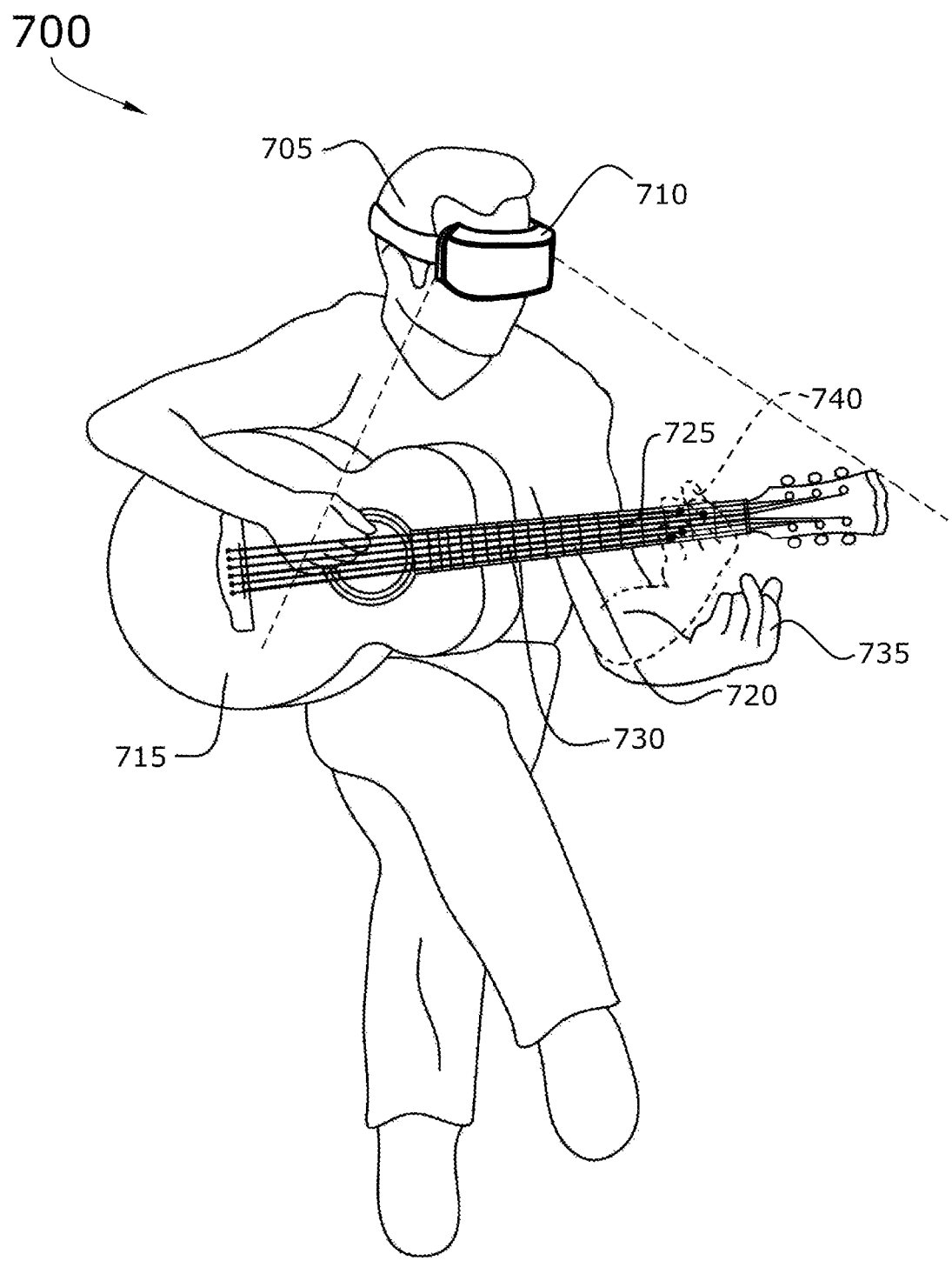
FIG. 7 conceptually illustrates a student user playing guitar while wearing goggles to view hand and fingers of an instructor playing a virtual guitar and demonstrating the strings being played on the virtual guitar in a mixed reality overlay view in some embodiments.

Specifically, FIG. 7 conceptually illustrates a student user playing guitar while wearing goggles 700 to view hand and fingers of an instructor playing a virtual guitar and demonstrating the strings being played on the virtual guitar in a mixed reality overlay view. The student user playing guitar in this example may be wearing VR goggles, AR goggles, or other mixed reality goggles. Furthermore, instead of goggles, the student user may be wearing smart glasses, or a device in which a smart phone is inserted to provide an immersive display view.

In this figure, a student user 705 wears goggles 710 (VR, AR, mixed reality, other immersive view goggles, etc.) to view a virtual guitar instruction via virtual hand and fingers 740 of a virtual instructor viewable through the goggles 710. The student user 705 is holding a physically real guitar 715 with a real fret board, real frets, and real strings. The student hand and fingers 735 may play the real strings on the real guitar 715 while watching the virtual guitar instructions through the goggles 710, or the student user 705 may just observe the virtual hand and fingers 740 of the virtual instructor play virtual overlay strings along a virtual overlay fret board with virtual overlay frets. In some embodiments, the virtual guitar instruction automatically aligns the virtual overlay fret board with the real fret board in realtime. This is shown as a composite fret board 720. In some embodiments, the virtual guitar instruction automatically aligns the virtual frets with the real frets in realtime. This is shown as a plurality of composite frets 725 along the composite fret board 720. In some embodiments, the virtual guitar instruction automatically aligns the virtual strings with the real strings in realtime. This is shown as a plurality of composite strings 730 running lengthwise along the composite fret board 720. In some embodiments, each note being played by the virtual instructor is shown virtually as a virtual dot, indicator, or marker at a location of the virtual finger 740 of the virtual instructor pressing on the virtual string (see as composite string 730 in the virtual environment or view). In some embodiments, intensity of each string that is played is determined and amplitude is calculated based on the intensity resulting in an intensity-amplitude measurement. In some embodiments, the intensity-amplitude measurement is demonstrated in the virtual environment or view through the goggles 710 by a level of opacity of each string. In some embodiments, the intensity-amplitude measurement is demonstrated in the virtual environment or view through the goggles 710 by different colors of a color scheme. For example, a color scheme may provide a mapping in which the weaker the intensity-amplitude, the lighter the color used to color the virtual string (which the student user 705 views as a composite string 730) and, similarly, in which the stronger the intensity-amplitude, the darker the color user to color the virtual string (again, viewed as the composite sting 730).

While the perspective of the virtual environment or view in which the student user 705 watches the virtual instructor play a virtual guitar is not a face-to-face view, as in the face-to-face view common in watching the instructional video described in the example above, there are many different possible perspectives (or camera angles) through which a virtual or semi-virtual environment can be shown. For instance, for augment reality implementations, the virtual environment may better suit the student user if the virtual instructor is in the virtual place of the student user, as if holding the guitar 715 of the student user 705, so to speak. This "in-place of student" view may be suitable and advantageous for augmented reality views, pure virtual reality environments or views, or other mixed reality views. However, other viewpoints (or so-called "camera angles") are possible and supported.

In some embodiments, the virtual instruction provides the student user 705, when wearing the goggles 710, with a virtual view in which the virtual instructor is facing the student user 705 in the virtual environment or view. In this case, the virtual instructor is not "in-place" with the student, but instead, is "face-to-face" with the student user 705. Thus, the virtual fret board, the virtual frets, and the virtual strings of the virtual guitar played by the virtual instructor are not aligned in realtime with the real fret board, real frets, and real strings of the real guitar 715 of the student user 705 and, therefore, are not composited together as "in-place" representations in the virtual environment (i.e., as the composite fret board 720, composite frets 725, and composite strings 730). Also, the virtual hand and fingers 740 of the virtual instructor would not appear in the virtual environment or view as overlaying the real guitar 715 (and real fret board, frets, and strings) of the student user 705. Instead, with the virtual instructor facing the student user 705 in the virtual environment or view shown while wearing the goggles 710, the virtual hand and fingers 740 of the virtual instructor would appear connected to the rest of the virtual body of the virtual instructor, in a "face-to-face" camera angle or viewpoint. In that case, the virtual hand and fingers 740 of the virtual instructor would appear semi-transparent so that the student user 705 could see the virtual strings being pressed by the virtual fingers 740 of the virtual instructor while the virtual guitar is being played.

While no exterior guitar instructional video would be needed in a pure virtual reality environment (because all guitar instruction would occur within the VR environment), in augmented reality and other mixed reality environments, the guitar instructional video may still play an essential role in delivering guitar instruction to the student user. This is the case because it is possible in augment reality views, virtual reality environments, or other mixed reality views to watch an instructional video in which the goggles present instruction in a face-to-face manner, rather than an in-place of student user manner. For example, the student user may wear AR glasses/goggles or other mixed reality goggles while watching an instructional guitar teaching video in which the AR glasses/goggles or other mixed reality goggles overlay the dots, indicators, or markers on the strings being pressed by the instructor in the video and the string playing intensity of each string is shown as an overlay based on color or opacity. These and other variations are anticipated and supported by the isolated guitar string audio capture and visual string indication and chord-finger number overlay process and system of the present disclosure.

In this specification, the terms "software", "program", "mobile app", and "app" are meant to include applications stored in magnetic storage of a computing device or other electronic system, which can be read into memory for processing by a processor. In particular, the processes described above may be implemented as software processes that are specified as a set of instructions recorded on a computer readable storage medium (also referred to as a non-transitory computer readable medium). When these instructions are executed by one or more processing unit(s), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

Figure 8:
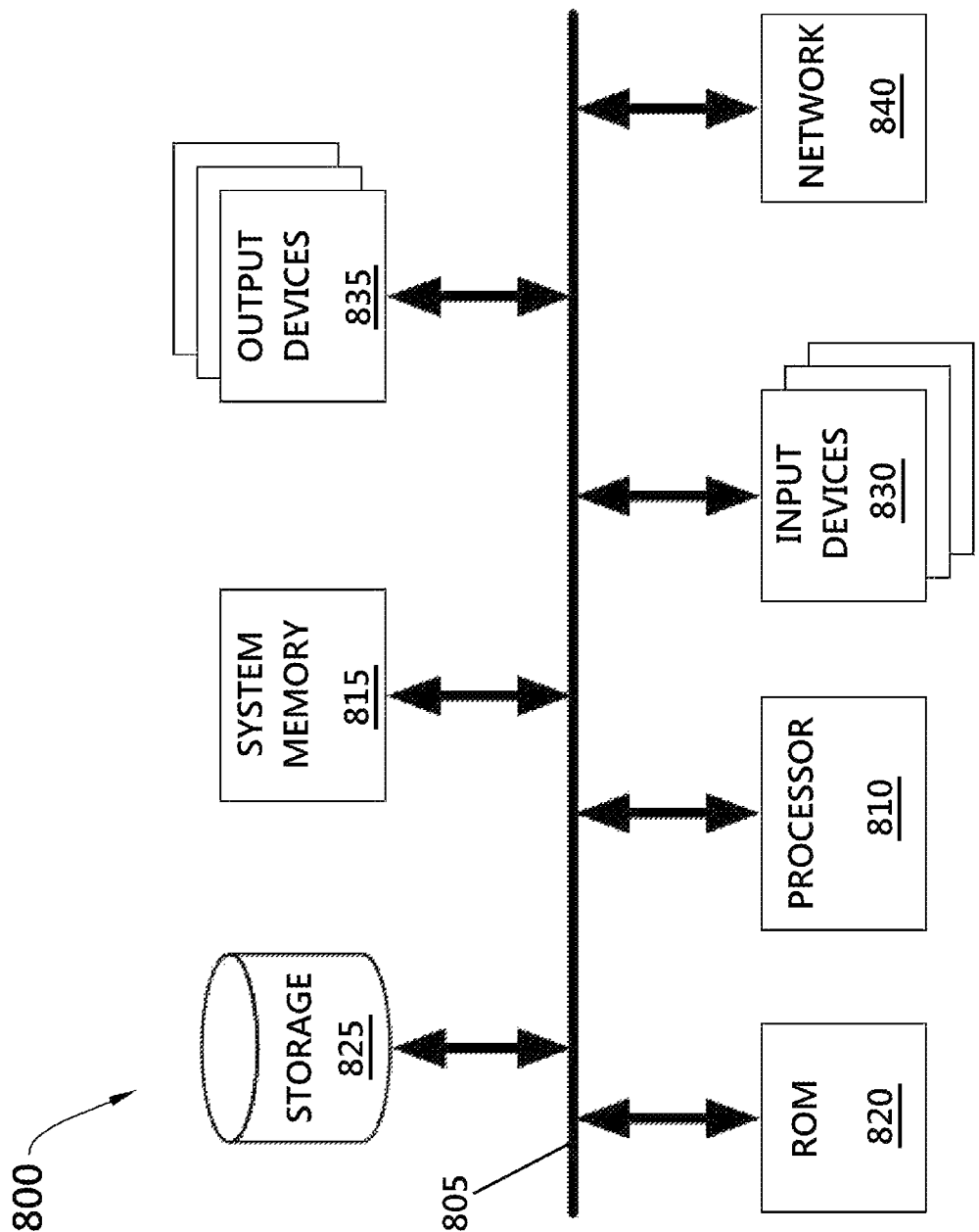
FIG. 8 conceptually illustrates an electronic system with which some embodiments of the invention are implemented.

FIG. 8 illustrates an electronic system 800. The electronic system 800 in this specification may be any form of traditional (conventional) computing device (e.g., desktop or laptop computer), mobile computing device (a smartphone, a tablet computing device, a smart watch, etc.), single board computer (e.g., Arduino, Raspberry Pi, etc.), embedded computing device, or any other sort of electronic device. As shown in this figure, the electronic system 800 includes various types of computer readable media and interfaces for various other types of computer readable media. Specifically, the electronic system 800 includes a bus 805, a processing unit(s) 810, a system memory 815, a read-only memory 820, a permanent storage device 825, input devices 830 (such as an audio mic and/or an embedded camera to capture video), output devices 835 (such as speakers, a touchscreen display, virtual reality goggles, augmented reality goggles, or any other display to output video or virtual views with visual line representations and markers of notes being played as an overlay to the video or in a virtual environment, etc.), and a network 840.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

I claim:

1. An isolated guitar string audio capture and visual string number overlay process comprising:
   recording a video with an audio track of a guitar instructor playing a guitar for a guitar instruction video;
   utilizing an isolation device to capture audio and isolate the sound coming from each individual string of the guitar whenever a string is played individually or in combination with other strings;
   recording each isolated individual string into a digital audio track recording of the string;
   overlaying guitar chord fingering markers on top of the instructor's fingers based on digital audio track recordings of all the strings played;
   overlaying semi-transparent guitar frets and strings on top of the instructor's hand to visual demonstrate which guitar fret is being used and which strings are being pressed and played; and
   layering the guitar instruction video with a transparency that includes visual representations of the overlaying guitar chord fingering markers and the semi-transparent guitar strings.

2. The isolated guitar string audio capture and visual string number overlay process of claim 1, wherein opacity level of the semi-transparent guitar strings is based on an intensity of the strings being played.

3. The isolated guitar string audio capture and visual string number overlay process of claim 2, wherein intensity of the strings being played is measured according to sound wave amplitude.

4. The isolated guitar string audio capture and visual string number overlay process of claim 1, wherein the isolation device comprises a divided guitar pickup.

5. The isolated guitar string audio capture and visual string number overlay process of claim 1, wherein the isolation device comprises audio capture hardware that has a MIDI connection to the guitar.

6. The isolated guitar string audio capture and visual string number overlay process of claim 1, wherein the isolation device comprises a computing device running a sound processing software application with a MIDI connection to the guitar.

7. The isolated guitar string audio capture and visual string number overlay process of claim 6, wherein the sound processing software application comprises a MIDI-based audio sensitive detection and isolation machine learning (ML) and artificial intelligence (AI) engine.

8. A non-transitory computer readable medium storing a program, when executed by a processor of a computing device, provides string and finger overlay visuals that modify an instructional string instrument video during playback by a viewer, said program comprising sets of instructions for:
   identifying a string of a multi-string music instrument being played by an instructor in an instructional video with audio of isolated sounds captured during a video recording of the instructor playing the multi-string music instrument;
   determining whether the string corresponds to a sound captured and isolated during the video recording;
   generating a visual marker at a location of a finger of the instructor pressing the string when the string corresponds to the sound captured and isolated during the video recording;
   overlaying the visual marker in the instructional video at the location;
   measuring amplitude of the string being played;
   generating a line as a semi-transparent overlay based on the amplitude; and
   overlaying the semi-transparent overlay of the line in the instructional video.

9. The non-transitory computer readable medium of claim 8, wherein the program further comprises sets of instructions for performing the steps for identifying, determining, generating the visual marker, overlaying the visual marker, measuring amplitude, generating the line, and overlaying the semi-transparent overlay for each string of the multi-string instrument.

10. The non-transitory computer readable medium of claim 9, wherein the program further comprises sets of instructions for repeatedly performing, for each frame of the instructional video, the steps for identifying, determining, generating the visual marker, overlaying the visual marker, measuring amplitude, generating the line, and overlaying the semi-transparent overlay for each string of the multi-string instrument.

* * * * *